United States Patent [19]
Khoury

[11] Patent Number: 5,744,935
[45] Date of Patent: Apr. 28, 1998

[54] PROCESS AND APPARATUS FOR NICKEL-CADMIUM BATTERY REVIVAL

[76] Inventor: Omar Fuad Khoury, P.O. Box 7203, Amman-11118, Jordan

[21] Appl. No.: 692,700

[22] Filed: Aug. 6, 1996

[51] Int. Cl.$^6$ .................. H01M 10/44; H02J 7/00
[52] U.S. Cl. .................. 320/2; 320/21; 429/49
[58] Field of Search .................. 320/2, 21–22, 320/61; 429/49; 323/909

[56] References Cited

U.S. PATENT DOCUMENTS

| | | | |
|---|---|---|---|
| 3,959,707 | 5/1976 | Stephens | 320/22 X |
| 4,302,714 | 11/1981 | Yefsky | 320/5 |
| 4,394,611 | 7/1983 | Fallon et al. | 320/21 |
| 4,554,500 | 11/1985 | Sokira | 320/21 X |
| 4,670,703 | 6/1987 | Williams | 320/22 |
| 4,746,854 | 5/1988 | Baker et al. | 320/21 X |
| 5,063,341 | 11/1991 | Gali | 320/21 |
| 5,084,664 | 1/1992 | Gali | 320/61 |
| 5,204,611 | 4/1993 | Nor et al. | 320/21 |
| 5,491,399 | 2/1996 | Gregory et al. | 320/61 |
| 5,525,892 | 6/1996 | Phommarath | 320/21 X |
| 5,592,068 | 1/1997 | Gregory et al. | 320/21 |

FOREIGN PATENT DOCUMENTS

598470-A2 5/1994 European Pat. Off. ........ H02J 7/10

OTHER PUBLICATIONS

Myers, Douglas C., "ZAP" New Life Into Dead Ni–Cd Batteries, Popular Electronic (Jul., 1977), pp. 60–61, Jul. 1977.

*Primary Examiner*—Peter S. Wong
*Assistant Examiner*—K. Shin

[57] ABSTRACT

The invention resides in a process and an apparatus for the revival of nickel-cadmium batteries and cells suffering from low, zero, or negative terminal voltage and unrechargeability. The process revives the cells or batteries by the injection of a short-duration high-magnitude current pulse through them. The apparatus to carry out the process is built around a current source that is operated either manually or by a timer for the required duration.

9 Claims, 2 Drawing Sheets

5,744,935

PROCESS AND APPARATUS FOR NICKEL-CADMIUM BATTERY REVIVAL

FIELD OF THE INVENTION

This invention relates in general to batteries and in particular to the revival of nickel-cadmium cells and batteries. The invention also relates to electronic circuitry designed to carry out the revival process.

BACKGROUND OF THE INVENTION

Nickel-cadmium batteries (nicads) provide one of the few sources of rechargeable portable electric power. Their various features made them find use in various types of portable equipment such as transceivers, laptop computers, camcorders, tools, cordless and cellular phones, etc.

In spite of the wide use of nicad batteries and of the various features they enjoy, they are overly sensitive to their pattern of usage of repetitive charge and discharge. As a matter of fact, the future performance of nicads depends to a large extent on their use at the present time. As we shall soon show, this pattern of use is quite difficult to control and to tailor to the ideal pattern; thereby leading to inevitable mishandling and possible abuse of the batteries. The end result is a large number of nicad batteries with degraded performance sometimes following fairly short-term use.

One particular case is that of low terminal voltage and unrechargeability. Quite often we find nicad batteries and cells with low voltages sometimes nearing or equaling zero volts and sometimes reversed polarity is observed in some cells. When attempts are made to charge these batteries, they do not charge although they are connected to their chargers for long hours. Moreover, their terminal voltages remain low, and the natural response by the user is to discard them and purchase new ones.

This problem was the motive for a study which led to a process and an apparatus to revive these batteries and to bring them back into use, lengthen their life-span, effect a saving, as well as protect the environment because discarded nicad batteries are considered toxic to the environment.

After the study was concluded, data on United States patents became available in the applicant's country on CD-ROM. A patent search was conducted and three patents addressing the problem of nicad capacity loss were found. Nonetheless, the processes disclosed were found to be costly, complex, time consuming, and inconvenient as may readily be seen from the following abstracts.

U.S. Pat. No. 4,055,709 issued Oct. 25, 1977 to Robert C. Medford discloses a rejuvenation process of nickel-cadmium cells by discharging the cells, charging the cells, flushing the cells with demineralized water in an ultrasonic bath, adding fresh electrolyte and then deep discharging.

U.S. Pat. No. 4,229,508 issued Oct. 21, 1980 to George K. Mussler discloses a process for the restoration of nickel-cadmium batteries. A battery is cleaned, submersed in boiling water and maintained therein for a period of time of approximately 15 to 20 minutes. The battery is removed from the boiling water and is immediately cooled to approximately room temperature by submersion in water at a temperature of from 45° to 50° F. for approximately 20 minutes. The battery is then in condition for electrical recharging.

U.S. Pat. No. 4,680,241 issued Jul. 14, 1987 to Christopher K. Dyer discloses a method for partially or fully restoring the lost capacity of nickel batteries and batteries formed thereby. A nickel battery is cycled at least 10 times with each cycle including a discharging step during which the capacity achieved at the end of the previous cycle is reduced by at least 5 percent, and a charging step. The ratio of the amount of charge delivered to the battery during the charging step of each cycle to the amount of charge withdrawn from the battery during the previous cycle is greater than one, and this ratio is chosen so that the temperature of the electrolyte does not exceed about 30 degrees Centigrade.

Whatever the precise merits, features and advantages of the above cited references, none of them achieves or fulfills the purposes of the present invention of reviving expended nickel-cadmium batteries and cells by the user quickly, with minimal cost, and with convenience and simplicity In the following paragraphs, some features of nicad batteries are discussed as they pertain to the development of the invention.

Cell and Battery

The fundamental unit of a nickel-cadmium electrochemical system is the CELL which has a nominal voltage of 1.2 volts (approximately 1.0 volt when discharged). A nickel-cadmium BATTERY is comprised of a number of cells cascaded in series to obtain any desired voltage such as 3.6, 4.8, 12, 14.4, 24 volts.

Capacity

The capacity of a battery is a means of specifying the power that can be supplied by the battery. The capacity is measured in ampere-hour (Ah) units which give the upper limit that can be attained for the various values of current-time product. For example, a 4 Ah battery can supply 2 A for 2 hours or 1 A for 4 hours (the capacity is reduced at high current values).

Charging

Charging is the process whereby current is driven through the battery from the positive terminal to the negative terminal in order to reverse the chemical reaction that took place when the battery was discharged.

The proper method of charging a fully discharged battery is to inject a current equal to one-tenth the capacity (C/10) for 10 hours (usually longer) in order to obtain the original capacity; although sometimes a smaller current and longer time is used. Fast chargers with temperature monitoring are sometimes employed to shorten charging time but at the expense of shorter cell life. The reason for preferring the use of small charging current for longer time is that charging causes heating that could harm the cells and shorten their life.

Charge and Discharge Curves

Some batteries exhibit a steadily decreasing voltage with discharge, thereby giving an indication about the depth of discharge. On the other hand, the voltage of a nicad battery remains practically constant throughout its discharge as shown in FIG. 1. After the battery is completely discharge and exhausted (knee of curve at point B) an abrupt voltage drop takes place.

Although constant voltage is a desirable feature, the user cannot determine the state of charge of the battery by measuring its voltage. This implies that the time needed to fully discharge a battery or the time to charge it cannot be determined also. This inevitably causes times when the battery is excessively discharged past the "knee" of its discharge curve which is harmful to the battery and its future performance (excessive discharge could even result in polarity reversal of the cell that discharges first in a series string). Moreover, there are times when the battery is overcharged which also is harmful due to the generated heat.

The ideal pattern of nicad battery usage is to fully discharge the battery to the knee of the curve then to charge it fully. Deviation from this cycling pattern leads to degradation in performance.

Memory Effect

Memory effect is an undesirable property of a nicad battery whereby a battery "remembers" the previous usage pattern and becomes conditioned to follow it. The effect causes a temporary loss of capacity or the inability to deliver the proper battery voltage. Memory, however, can be erased by cycling through complete discharge and charge periods for a couple of times.

Storage

Storage and inactivity is harmful to nicads. Therefore, they should be taken out of storage every now and then, fully discharged, then recharged again in order to preserve their properties. This procedure requires time and effort, and is not followed most of the time thereby leading to low voltage and unrechargeability.

SUMMARY OF THE INVENTION

Nickel-cadmium batteries, sometimes following short-term usage, exhibit low terminal voltage and unrechargeability which renders them useless and calls for their replacement. The discarded batteries mean extra cost to the user as well as harm to the environment due to their toxicity. A study was conducted on these batteries and culminated in a process to revive these batteries. The process restores original terminal voltage, rechargeability, and original capabilities. The process revives batteries by the injection of a short-duration high-magnitude current pulse through them. The apparatus to carry out the process is built around a current source that is operated either manually or by a timer for the required duration.

The revival process meets the object of being carried out by the user swiftly, with minimal cost, and with convenience and simplicity.

Other objects met by the process are the avoidance of tampering with battery structure and avoidance of battery overheating.

The use of a current source for revival meets the object of being usable for the revival of a single cell or a battery of cells. It is also congruent with the manner of charging of nicads with constant current, and it maintains a fixed current value throughout the revival process.

Other objects and features of the invention will become apparent from the following description.

DETAILED DESCRIPTION OF THE INVENTION

Stages of the Study

1. In light of the previously mentioned background, the study started on the premise that nicad batteries and cells are affected by their charge and discharge pattern, excessive discharge, overcharge, memory, storage, and the fact that mishandling is an inherent feature.

Figure 1:
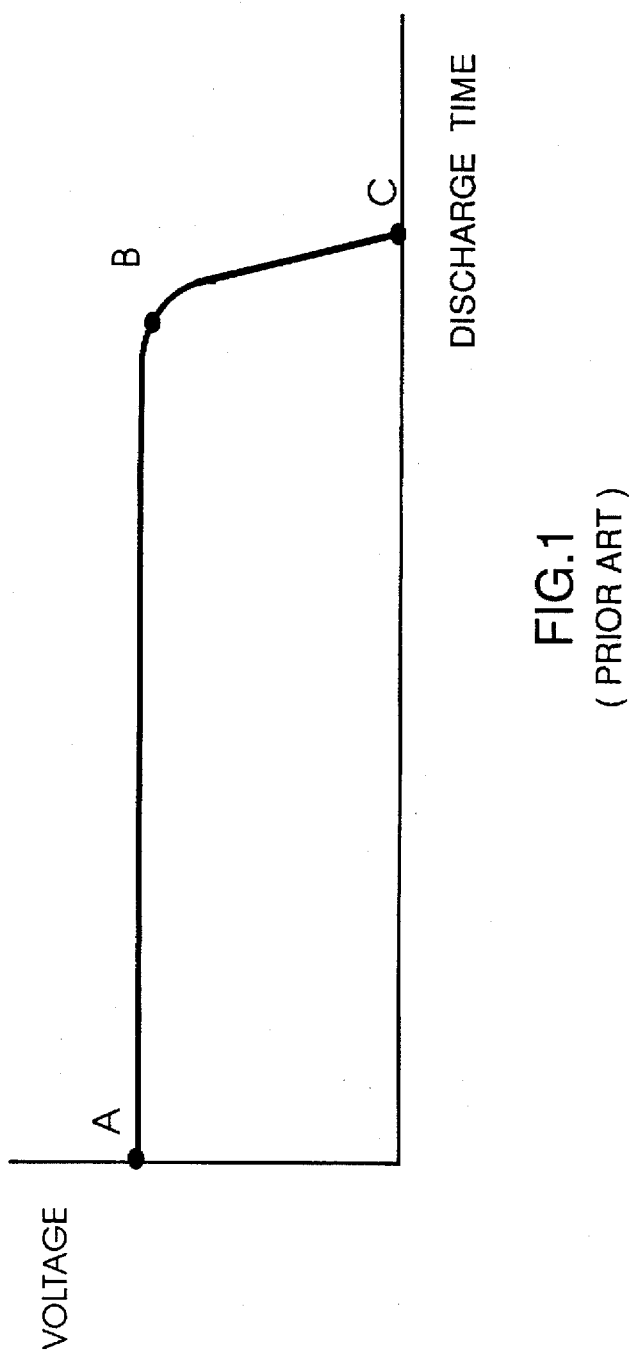
FIG. 1 (prior art) shows the voltage level of a nickel-cadmium battery or cell as it is charged or discharged.

2. The study considered cells and batteries with reduced capacity exhibiting low or zero terminal voltage and unrechargeability in a state of dormancy. They were considered to be between points "B" and "C" in FIG. 1, and that they reached this state due to their previous usage (reversed polarity cells are right below point "C").

3. Because the batteries were unrechargeable with their regular chargers, it was decided to inject a high current in the charging direction in order to force the chemical reaction to proceed and to restore the original voltage.

4. Initially a power supply was used and the cell or battery would be connected across the power supply. Then the voltage of the power supply would be raised to drive a high current for a few minutes through the cell or battery (experiments were conducted on batteries and cells with capacities up to 4Ah).

5. After a few minutes the battery or cell would be disconnected and its voltage measured. It was found that in most cells and batteries the terminal voltage had risen from zero volts to the original nominal value of 12 or 14.4 volts for example.

6. It was believed that the high value of current (on the order of several amperes) being applied for a few minutes could be harmful to the battery in the long run; therefore, experiments were conducted to reduce both the current and the time.

7. It was found that applying a short duration current pulse (a current source to be described later was used) was sufficient to revive the batteries and to bring their voltage back up from the very low, zero, or negative original voltage. After many experiments it was found that a current pulse of about 3 A for about 5 seconds is satisfactory for most cases. These values can be modified, and they can be increased for batteries with higher capacities. It is noteworthy that the use of a current source achieves several goals. It enables the revival of batteries with differing voltages by driving the same current through them, and it is also congruent with the manner of charging of nicads with constant current. Moreover, it maintains the same current value throughout the revival period as the voltage of the battery rises up thereby maintaining effectiveness. On the other hand, the use of a voltage source that is varied to drive current in a battery causes the current to drop as the opposing voltage of the battery rises during revival.

8. To assess the ability of a revived battery to supply current, it was connected to a lamp which emitted light for a short time. This implied that the battery was at the knee of its discharge curve, point B FIG. 1. Therefore, to restore the capacity of the battery it was charged at the normal rate C/10 to bring it back to point A, FIG. 1. And indeed the battery was rechargeable although initially it exhibited unrechargeability.

9. To verify a battery's charge retention capability as well as its ability to deliver power, its capacity was measured in ampere-hour by discharging through a load at high current. The voltages, capacities, and performance of revived batteries were found to match their specified values.

10. It was noted that some batteries needed reviving a second time if their terminal voltage was allowed to drop excessively in their first discharge following revival; after that they reverted to normal behavior. Memory effect was also noted in some batteries but was removable by cycling.

11. The application of the short-duration high-magnitude current pulse was not found to have any harmful effect (when applied to new or revived batteries) and was successful in reviving many cells and batteries. The success rate differed according to battery usage. For fairly new and not very heavily used batteries the rate was about 100 percent. For batteries that were used for years (which are probably close to the end of their life) the rate was about 70 percent. At certain times some cells don't revive and the voltage of a battery would be the nominal value less the voltage of one cell for example; in such case the battery could be used for non-critical applications or that particular cell may be replaced.

12. The process of revival by the injection of a short-duration high-magnitude current pulse may be applied to batteries with reduced capacities as discussed, and it may also be routinely administered as a mild pre-charging kick of a shorter duration and lesser magnitude to normal batteries by their chargers before normal charging in order to assure rechargeability.

DESCRIPTION OF THE PREFERRED EMBODIMENT OF THE APPARATUS

To carry out the previously mentioned process of battery revival, an apparatus was designed to deliver the short-duration current pulse to any cell or battery that needs revival regardless of its original nominal voltage.

Figure 2:
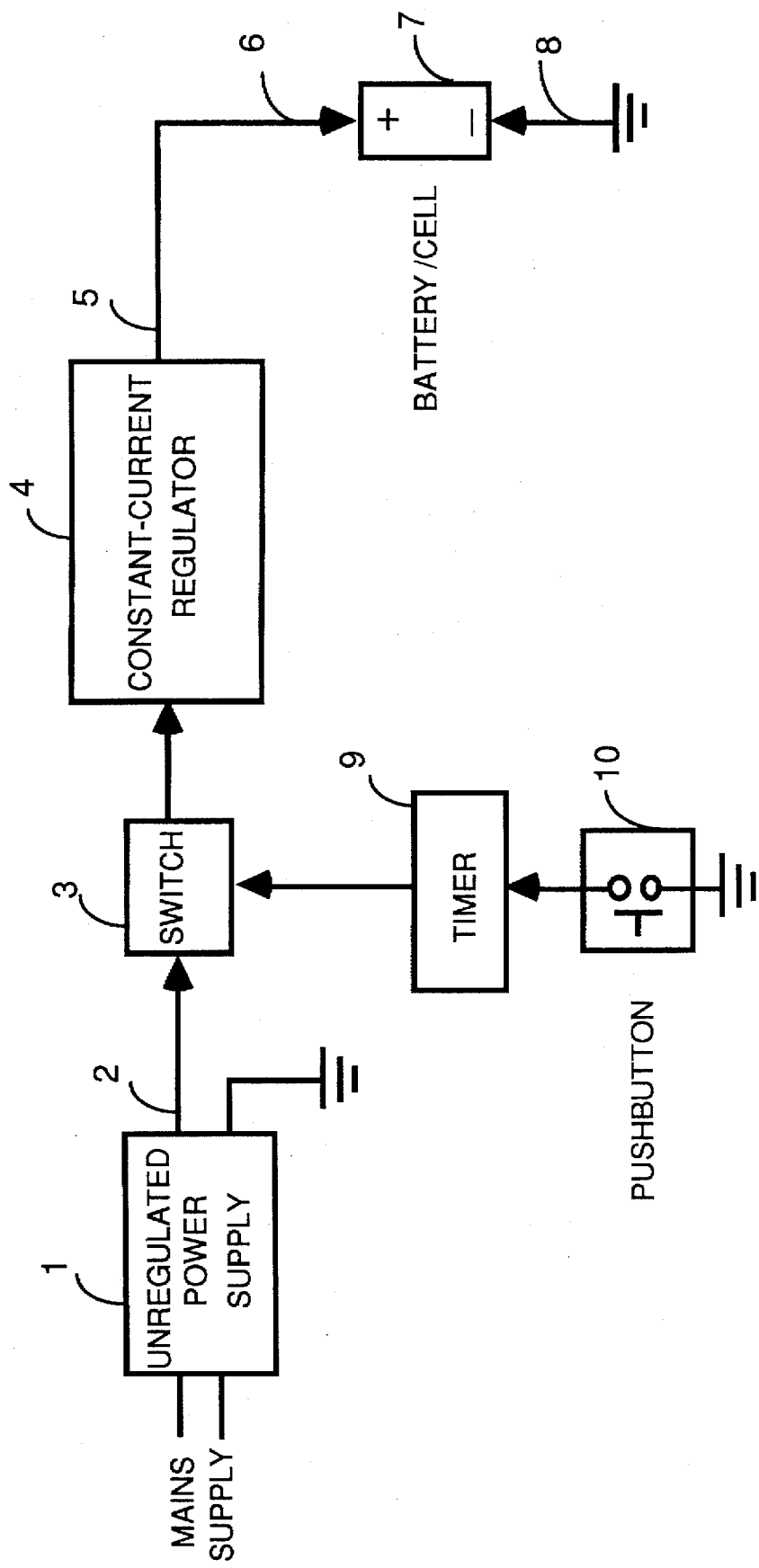
FIG. 2 shows the block diagram of the apparatus used to carry out the battery revival process.

The preferred embodiment of the apparatus, shown in FIG. 2, comprises the following. A standard unregulated power supply 1, or any source of DC power; the output of which 2 should have a sufficient voltage that is several volts higher than the highest battery voltage to be revived. The voltage difference is needed to account for voltage drop in the following stages and the temporary overshoot in battery voltage. The apparatus also consists of an electrically controlled switch 3, preferably a power MOSFET transistor to apply the DC power when in a conductive state to the next stage 4 which is a constant-current regulator. The constant-current regulator may be implemented in various ways. Preferably, a three-terminal adjustable voltage regulator integrated circuit could be used in conjunction with an external current-setting resistor to form a two-terminal current source. When supplied by DC power on its input, the current source provides a constant current on its output (the amplitude of the current may be adjustable by varying the value of the resistor). The output of the current source 5 is applied to the positive terminal of the battery to be revived 7 by the connection terminal 6. The negative terminal of the battery is connected to ground by the other connection terminal 8 to close the electric circuit and permit current flow. The apparatus also contains a timer 9 which is triggered by a push-button 10 to output a pulse of a specific duration (the duration or width may be adjustable by varying the time setting components in the monostable circuit). The pulse is used to control the switch 3 turning it on for the duration of the pulse. When the switch is conducting, it energizes the constant-current regulator 4 which in turn outputs a current that is applied to the battery for the duration of the control pulse. The timer could be realized by a CMOS monostable multivibrator circuit, preferably non-retriggerable. The CMOS monostable can output a voltage that is greater than 10V to fully turn the power MOSFET on. It should be supplied with power by a voltage greater than 10V that may be derived from the unregulated DC voltage by means of a voltage divider as the monostable draws small current. The trigger could be a falling edge to ground as shown in FIG. 2 or it could be a rising edge trigger to the monostable supply voltage. The timer could also be implemented using a 555 timer used as a non-retriggerable monostable multivibrator, but in this case it will require a stiff voltage divider of fairly small resistors for its supply voltage. The 555 CMOS version could also be used.

It should be noted that the relative location or the ordering of the series-connected switch 3 and constant-current regulator 4 and battery 7 may be changed without affecting the operation of the apparatus. That is, they may be permutated. It should also be noted that if the switch 3 is implemented using a power MOSFET it is preferable to relocate it and connect it between the negative terminal of the battery and ground to simplify the design using an N-channel power MOSFET transistor.

The apparatus is operated by connecting the battery to be revived to connection terminals 6 and 8 with the positive battery terminal connected to 6 and the negative to 8. Power is applied to the apparatus. Then the revival process is initiated by pressing the push-button 10. The push-button activates the timer 9 to output a pulse, the pulse turns switch 3 on, power passes through the switch to the constant-current regulator 4 which outputs a current pulse with duration set by the timer and magnitude set by the regulator itself, the pulse is then passed through the battery through the connection terminals 6 and 8. This concludes the revival process which is to be, preferably, immediately followed by normal charging.

Other variations of the embodiment are possible. For the current source, the use of a three-terminal adjustable voltage regulator is particularly suitable for battery voltages that are equal to or less than 24V which is the highest common battery voltage. But the current source may also be implemented with a power MOSFET of a high rating used as a voltage-controlled current source in which case the timer signal would be connected to the gate of the MOSFET and there will be no need for the separate switch 3 as its function has been incorporated in the constant-current source 4.

The switch 3 could be a relay, but it will need more drive from the timer to operate it. In a simpler version of the design, the switch 3 may be manually-operated and there will be no need for the timer and its triggering circuit. Moreover, the manually-operated switch may simply be a contact point to close the current path at any point in the path, or preferably at one of the battery terminals. This may be implemented by means of a hand held contact point that is brought to contact with one of the battery terminals.

An alternate apparatus is the one mentioned previously of using a variable DC voltage source of sufficient voltage and connecting the battery across it with the positive terminals connected together and the negative terminals together. The voltage is increased to drive the desired current into the battery for the desired duration. There should be a means for current monitoring either as a part of the source or external to it preferably in the form of a meter. This apparatus, however, is considered inferior to the constant current one as the current value will vary during revival and become less effective. Attempts to manually adjust the current amplitude to a fixed value are less likely to be successful. Automatic adjustment calls for a more complex design.

The foregoing description of the preferred and possible embodiments of the invention has been presented for the purposes of illustration and description. It is not intended to be exhaustive or to limit the invention to the precise form disclosed. Numerous modifications, variations, changes, and substitutions will become apparent to those skilled in the art without departing from the invention herein. Accordingly, it is intended that the invention be limited only by the spirit and scope of the appended claims.

I claim:

1. A process to revive nickel-cadmium batteries or cells comprising:

providing a battery or cell suffering from unrechargeability and low, zero, or negative terminal voltage;

the injection of a short-duration high-magnitude constant-amplitude current pulse through the battery or cell from the positive to the negative terminal;

and thereby raising the terminal voltage and allowing the battery or cell to be rechargeable and usable again.

2. A process according to claim 1 wherein the battery or cell is normal and the duration and magnitude of the current pulse are reduced to provide a mild precharging kick in battery chargers to assure rechargeability.

3. An apparatus to carry out the revival process, for any battery that needs revival regardless of its original nominal voltage, comprising:

a source of DC power, or an unregulated power supply of sufficient voltage;

a constant-current regulator producing a constant current at its output when powered by a DC voltage at its input;

an electrically-controlled switch connected at its input to said DC power source, and connected at its output to said constant-current regulator, and having a control terminal to receive a control signal to put it in a conductive state in order to permit current flow from the DC power source to the constant-current regulator for the duration of the control signal;

means for connecting the positive terminal of the battery to be revived to the output of said constant-current regulator, and means for connecting the negative terminal to ground;

a timer to produce a control signal of a specific duration in response to an input trigger signal, the output of said timer is connected to the control terminal of said electrically-controlled switch; and a push-button to activate said timer by the application of a trigger signal to the trigger input of said timer.

4. The apparatus of claim 3 wherein the series-connected electrically-controlled switch and constant-current regulator and battery are permutated.

5. The apparatus of claim 3 wherein the electrically-controlled switch is connected between the negative terminal of the battery and ground.

6. The apparatus of claim 3 wherein the current path may be closed by means of a manually-operated switch or contact point anywhere in the current path.

7. The apparatus of claim 3 wherein said electrically-controlled switch is incorporated in said constant-current source.

8. The apparatus of claim 3 wherein the amplitude of the current produced by the constant-current regulator is adjustable.

9. The apparatus of claim 3 wherein the width of the control signal produced by the timer is adjustable.

* * * * *